(12) United States Patent
Hung (10) Patent No.: US 12,504,119 B1
(45) Date of Patent: Dec. 23, 2025

(54) LUBRICANT ATOMIZING DEVICE FOR GREASE GUNS

(71) Applicant: KING CHO MACHINERY INDUSTRIAL CO., LTD., Taichung (TW)

(72) Inventor: Fu Tien Hung, Taichung (TW)

(73) Assignee: King Cho Machinery Industrial Co., Ltd., Taichung (TW)

( * ) Notice: Subject to any disclaimer, the term of this patent is extended or adjusted under 35 U.S.C. 154(b) by 0 days.

(21) Appl. No.: 18/946,146

(22) Filed: Nov. 13, 2024

(30) Foreign Application Priority Data

Oct. 17, 2024 (TW) .................. 113139619

(51) Int. Cl.
  *F16N 3/12* (2006.01)
  *F16N 5/02* (2006.01)

(52) U.S. Cl.
  CPC ...................... *F16N 5/02* (2013.01)

(58) Field of Classification Search
  CPC ............ F16N 5/02; F16N 3/12; B05C 17/015
  USPC ....................................... 184/105.2
  See application file for complete search history.

(56) References Cited

U.S. PATENT DOCUMENTS

| | | | | |
|---|---|---|---|---|
| 1,981,905 A | * | 11/1934 | Davis | F16N 5/02 222/256 |
| 2,134,735 A | * | 11/1938 | Reinhold | F16N 5/02 173/169 |
| 2,183,013 A | * | 12/1939 | Davis | F16N 5/00 222/324 |
| 3,094,901 A | * | 6/1963 | Wandel | B25C 1/041 91/417 R |
| 3,733,032 A | * | 5/1973 | McLeod | B05B 7/2494 141/27 |
| 3,829,025 A | * | 8/1974 | McLeod | B05B 7/241 141/27 |
| 3,987,869 A | * | 10/1976 | Bowers | F16N 13/10 224/628 |
| 4,113,151 A | * | 9/1978 | Brown | G01F 11/024 222/327 |
| 4,137,998 A | * | 2/1979 | Kusada | F16N 37/003 184/14 |
| 5,067,591 A | * | 11/1991 | Fehlig | F16N 5/02 184/29 |
| 5,474,214 A | * | 12/1995 | Chung | F16N 5/02 222/389 |
| 6,494,347 B1 | * | 12/2002 | Yeh | G01F 11/026 184/29 |

(Continued)

*Primary Examiner* — Michael A Riegelman
(74) *Attorney, Agent, or Firm* — Rosenberg, Klein & Lee (57) ABSTRACT

A lubricant atomizing device for a grease gun involves refined spray-on grease for the external surfaces of large mechanical components, and includes an oil discharge tube and a refinement tube nozzle connected to the front end of the main body. An air pressure source is connected to the main body. A flow diverter switch is installed on the main body that divides the air pressure source into two streams. One air pressure flows into the main body to drive a piston chamber to pressurize and squeeze out the grease, while the other air pressure flows through a flexible tube into the refinement tube nozzle. Through the reduction in hole diameter to accelerate air flow, and under the dual action of pressurizing the piston chamber and accelerating the refinement of grease through air flow, the grease gun can smoothly and uniformly spray out refined grease.

10 Claims, 10 Drawing Sheets

(56) References Cited

U.S. PATENT DOCUMENTS

| | | | |
|---|---|---|---|
| 6,736,292 B2* | 5/2004 | Grach | F16N 11/10 |
| | | | 92/181 R |
| 6,935,541 B1* | 8/2005 | Campbell | B05C 17/015 |
| | | | 137/557 |
| 9,057,482 B2* | 6/2015 | Hung | F16N 5/02 |
| 2004/0074927 A1* | 4/2004 | Lafond | B05C 17/00559 |
| | | | 222/327 |
| 2012/0298697 A1* | 11/2012 | Guo | F16N 3/12 |
| | | | 222/387 |
| 2013/0313051 A1* | 11/2013 | Hung | F16N 5/02 |
| | | | 184/41 |

* cited by examiner

LUBRICANT ATOMIZING DEVICE FOR GREASE GUNS

BACKGROUND OF THE INVENTION

1. Fields of the Invention

The present invention relates to a grease gun, and more particularly, to a lubricant atomizing device that widely sprays refined lubricant or grease to large machinery.

2. Descriptions of Related Art

Grease guns are generally used to lubricate joints in mechanical equipment or male-female mating surfaces between multiple mechanical parts to reduce wear and extend their service life. However, some large mechanical equipment has male-female mating surfaces that cover a large area, which requires using a grease gun to spray grease over large surface areas of large mechanical components.

Figure 10:
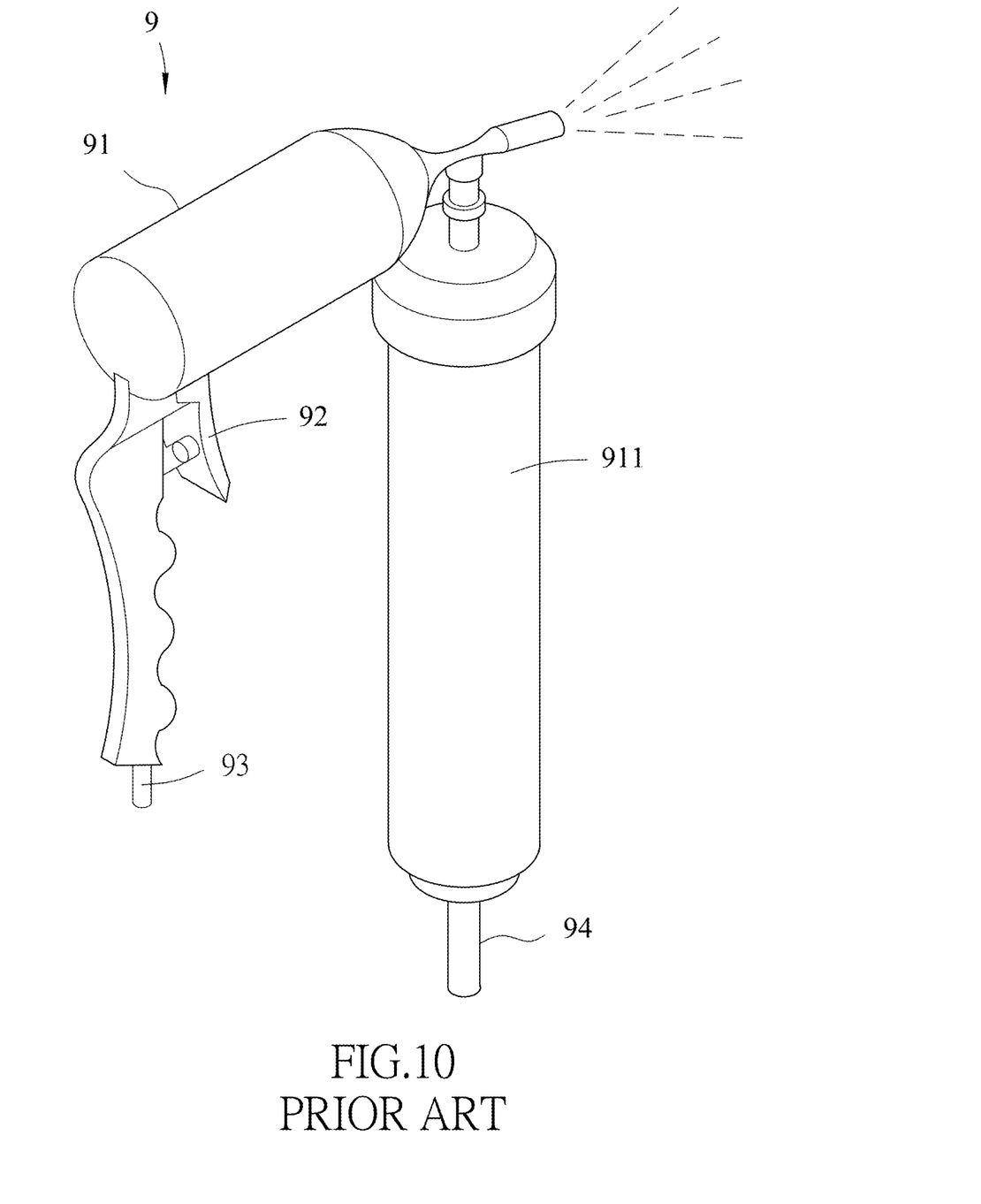
FIG. 10 is a schematic diagram of a conventional grease gun.

Please refer to FIG. 10, which shows a known grease gun 9, as disclosed in Chinese Utility Model Patent No. CN217559535 "A High-Sealing Automatic Pneumatic Grease Gun," equipped with a gun body 91 having a grease container 911, a pressure lever 92, a first air pressure source 93, and a second air pressure source 94. The first air pressure source 93 is connected below the gun body 91, while the second air pressure source 94 is connected below the grease container 911. Operating the pressure lever 92 activates the first air pressure source 93 in conjunction with the second air pressure source 94 to push out the grease inside the gun body 91, facilitating lubricant spraying over large surface areas of mechanical components.

However, this known grease gun 9 relies on the second air pressure source 94 to directly push out the grease, and since large mechanical components have larger surfaces requiring extended spraying time, the known grease gun 9 often causes the grease flow to lag behind the air pressure source operation. This necessitates the use of dual air pressure sources, and during the spraying process, it creates an intermittent, uneven flow. Additionally, the sprayed grease often comes out in inconsistent large and small clumps of refined grease. Sometimes manual labor is still required to spread and refine the large clumps of grease on the surface of large mechanical components, making the lubrication operation quite inconvenient and consequently hindering the operational efficiency of lubricating large mechanical components. Therefore, there is a genuine need to improve the structural design of this known grease gun 9.

The present invention intends to provide a lubricant atomizing device for a grease gun to eliminate the shortcomings mentioned above.

SUMMARY OF THE INVENTION

The present invention relates to a lubricant atomizing device for a grease gun, and comprises a grease gun including a grease storage area installed in a main body of the grease gun and an oil discharge tube having a multi-stage inner hole. The grease storage area is connected to the oil discharge tube, and an air pressure channel is provided at an end of the main body. A refinement tube nozzle has a refinement channel and an air passage. The air passage is connected to the refinement channel which is installed and connected to a front end of the oil discharge tube. The refinement channel has a coupling section, a constriction section, and a refinement section from inside to outside thereof. The coupling section is connected to the front end of the oil discharge tube. A flow diverter switch is installed on the main body and includes a flow diversion component and a flexible tube. A first end of the flexible tube is connected to the flow diversion component of the flow diverter switch. A second end of the flexible tube is connected to the air passage of the refinement tube nozzle. The flow diverter switch is connected to an air pressure inlet located in the air pressure channel of the main body.

Preferably, the multi-stage inner hole of the oil discharge tube includes a first-stage inner hole, a second-stage inner hole, and a third-stage inner hole from inside to outside thereof. The diameter of the first-stage inner hole is 0.5 to 3 times larger than the diameter of the second-stage inner hole. The diameter of the second-stage inner hole is 0.5 to 4 times larger than the diameter of the third-stage inner hole. A ratio of the diameter to the length of the third-stage inner hole is between ½ and ⅙.

Preferably, the air passage of the refinement tube nozzle is connected perpendicularly to the refinement channel, and the constriction section has an angle. The angle is set between 40° to 60°.

Preferably, the flow diversion component internally contains a first channel and a second channel. The first channel is connected to the second channel through a control zone. An operating switch is fitted into and installed in the control zone. The first channel is connected to the air pressure inlet in the main body, and the second channel is connected to the inlet of the flexible tube.

Preferably, the operating switch includes a locking tenon, a rotating shaft, and a spring. A surface of the flow diversion component has a passage that penetrates through the control zone. The locking tenon is fitted and fixed within the passage. The rotating shaft has a release groove and a compression groove corresponding to the locking tenon. The bottom end of the rotating shaft presses against one end of the spring, and the other end of the spring presses against a bottom of the control zone.

Preferably, the flow diverter switch is connected to an external air pressure source. A high-pressure gas from the air pressure source passes through the flow diversion component of the flow diverter switch. The high-pressure gas is diverted through the first channel to form a first air pressure, and diverted through the second channel to form a second air pressure.

Preferably, the first air pressure forces the grease in the grease storage area to flow toward the oil discharge tube. When the grease flows into the refinement channel of the refinement tube nozzle, the grease is applied by a force of the first air pressure and a force of the second air pressure, so that the grease is pushed outward while continuously and uniformly refined during spraying.

Preferably, a total frictional force between the grease and the inner wall of the oil discharge tube, and between grease molecules forms is set as a viscous force. When the first air pressure pushes the grease, the force of the second air pressure simultaneously draws in the grease located in the third-stage inner hole of the multi-stage inner hole, such that a total force formed by the combination of the first air pressure force and the second air pressure force is greater than the viscous force.

Preferably, when the release groove of the rotating shaft is engaged with the locking tenon, the first channel communicates with the second channel. When the compression groove of the rotating shaft is engaged with the locking tenon, the first channel does not communicate with the second channel.

Preferably, the main body has a piston chamber, the piston chamber connects the air pressure channel with the oil discharge tube. The oil discharge tube is connected to the front end of the main body through an extension part.

The primary object of the present invention is to provide a lubricant atomizing device for a grease gun that can achieve smooth and uniform refined spraying using only a single air pressure source.

Another object of the present invention is to provide a lubricant atomizing device of a grease gun that has wider applicability and is easier to install and use.

The present invention involves installing the flow diverter switch on the main body of the grease gun, which enables the use of just a single air pressure source that, when passing through the flow diverter switch, is divided into two streams. One air pressure flows into the air pressure channel in the main body, and through the piston chamber, squeezes the grease from the grease storage area into the refinement channel inside the refinement tube nozzle. The other air pressure flows through the flexible tube into the air passage of the refinement tube nozzle and surrounds the grease within the refinement channel. That is, through the piston chamber pressurizing the grease to flow into the refinement channel, combined with its gradually decreasing diameter, and accelerating the airflow of the second air pressure stream entering the refinement channel, together these features enable the grease to be uniformly refined and sprayed onto large areas of mechanical component surfaces.

This invention involves installing the refinement tube nozzle, the oil discharge tube (and the extension part), the flow diverter switch, and its flexible tube onto an existing grease gun. By operating the flow diverter switch to direct the air pressure source to flow into both the first channel and second channel, the refinement tube nozzle can uniformly spray refined grease onto large areas of mechanical component surfaces. When the refinement tube nozzle, the oil discharge tube (and the extension part), the flexible tube, etc. are removed from the grease gun, simultaneously operating the flow diverter switch to seal off the flow between the first channel and second channel while maintaining only the flow between the air pressure source and the first channel and air pressure channel, the grease gun then returns to its general function of injecting grease into grease nipples.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
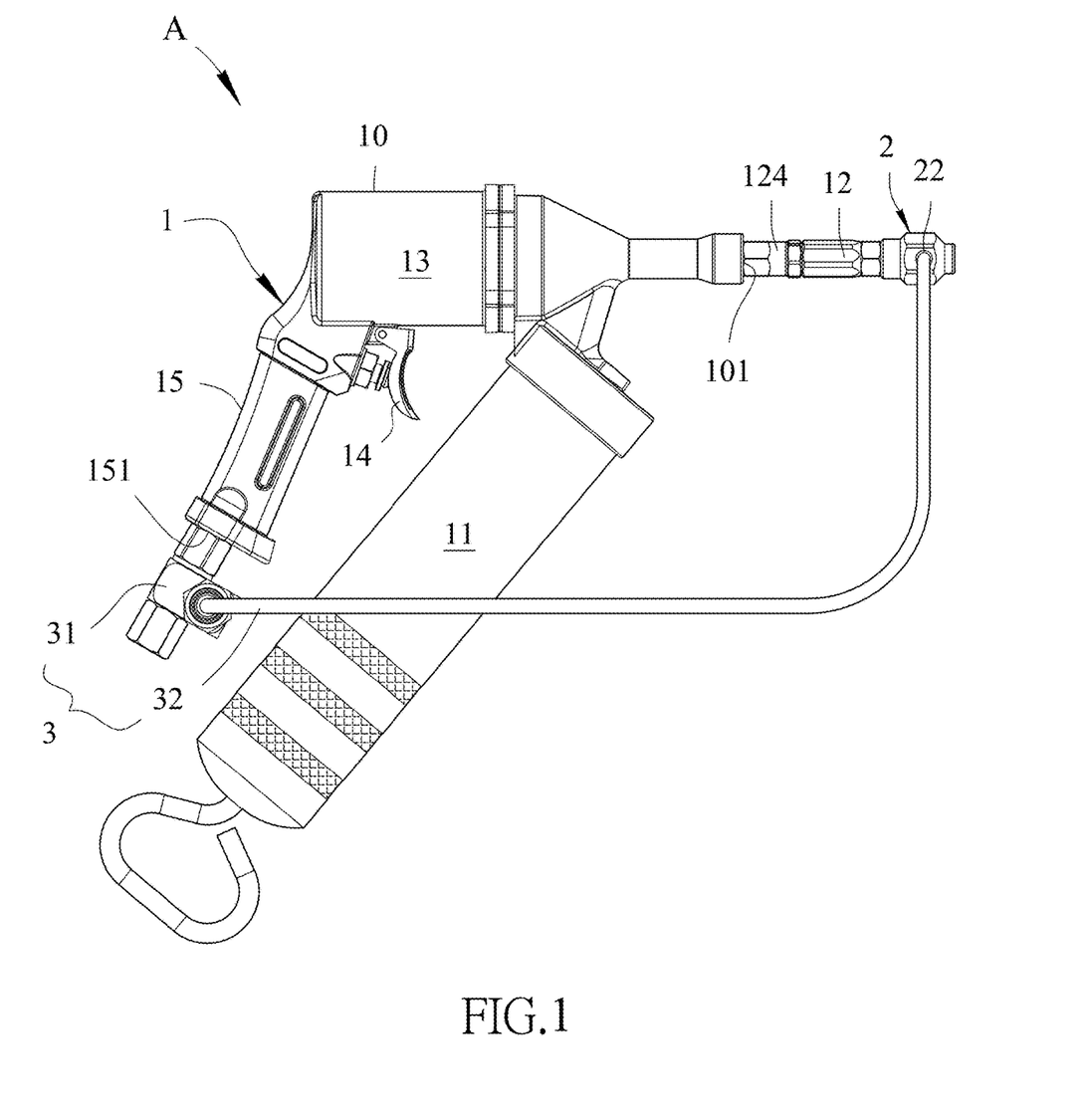
FIG. 1 is a schematic diagram of the grease gun and the lubricant atomizing device of the present invention.

As shown in FIG. 1, the lubricant atomizing device "A" for a grease gun that smoothly and uniformly sprays lubricant such as refined grease onto large mechanical components, and comprises a grease gun 1, a refinement tube nozzle 2, and a flow diverter switch 3.

Figure 2:
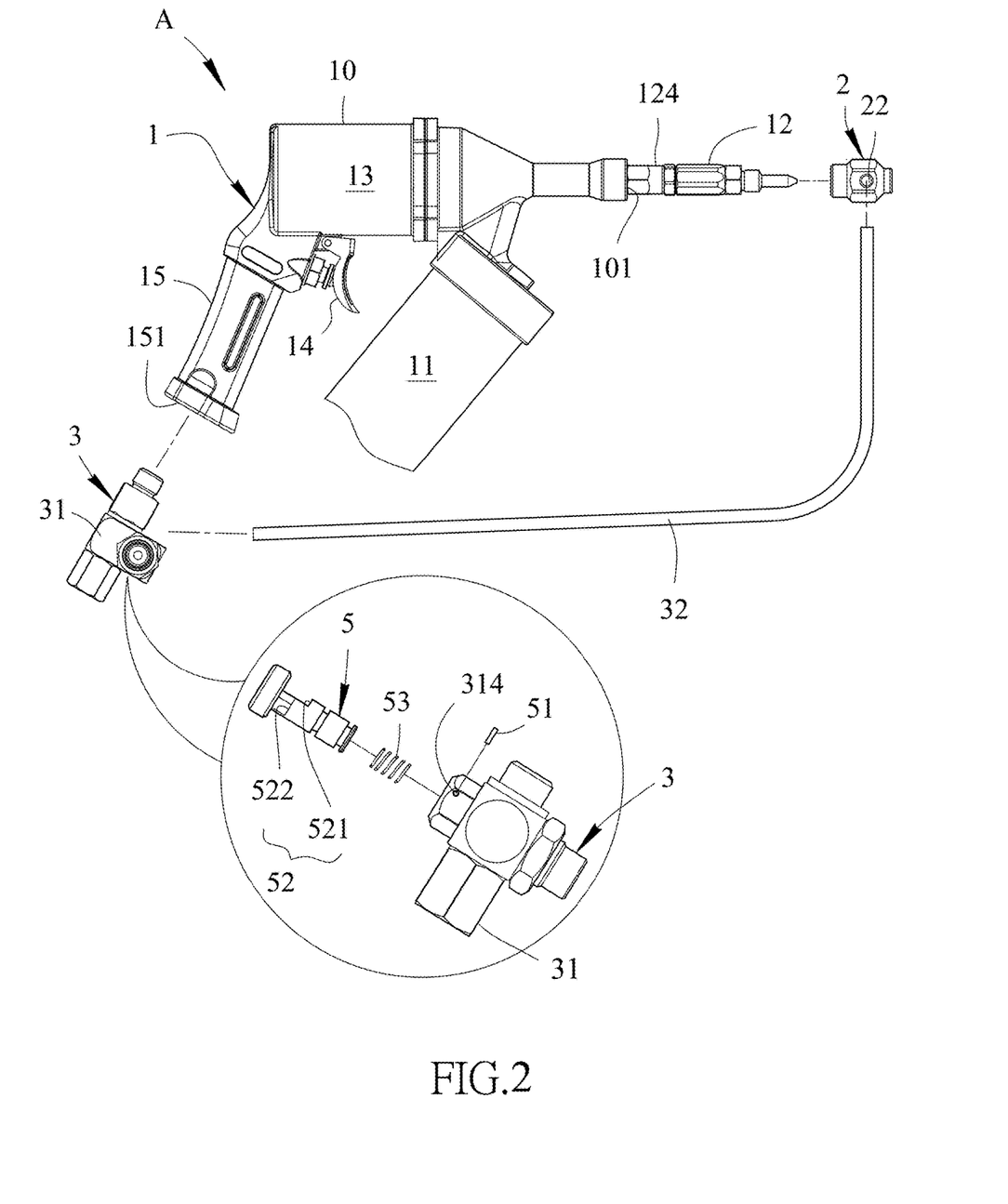
FIG. 2 is an exploded view of the lubricant atomizing device and an enlarged exploded view of the flow diverter switch of the present invention.
Figure 3:
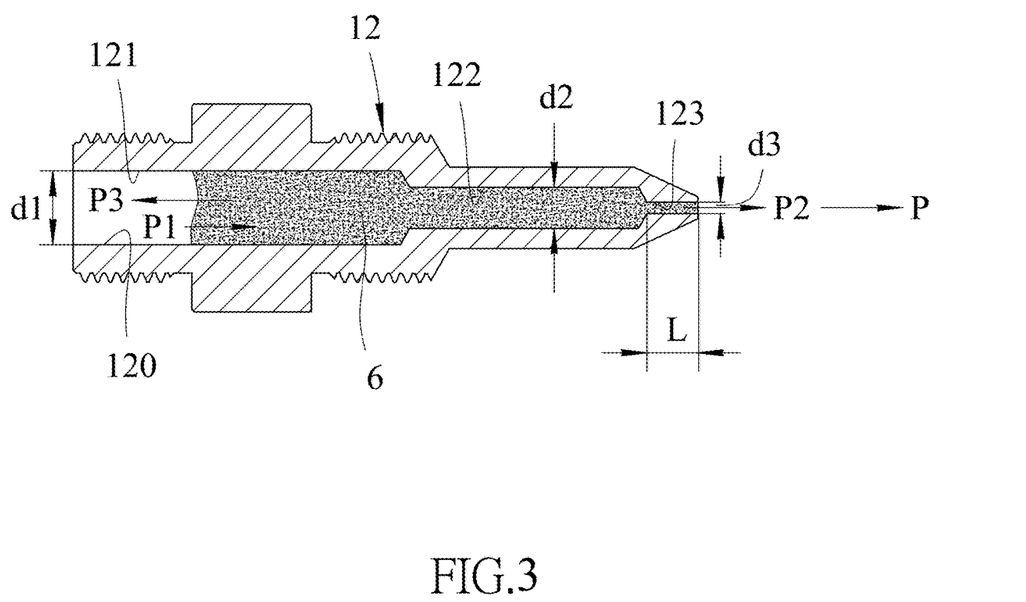
FIG. 3 is an enlarged sectional view of the oil discharge tube of the present invention.

As shown in FIGS. 2 and 3, the grease gun 1 includes a grease storage area 11 installed in a main body 10 and an oil discharge tube 12 having a multi-stage inner hole 120. The ratio of the smallest diameter d3 of the multi-stage inner hole 120 to its length L is set between ½ to ⅙ (with the preferred d3/L ratio being ¼). The grease storage area 11 is connected to the oil discharge tube 12, and typically the grease storage area 11 is a grease container that can continuously supply grease. The main body 10 has a piston chamber 13, with an air pressure channel 15 connected to the end of the piston chamber 13. The piston chamber 13 works in conjunction with the high-pressure gas flowing in from the air pressure channel 15 to push grease from the grease storage area 11 into the interior of the multi-stage inner hole 120 of the oil discharge tube 12. The end of the oil discharge tube 12 can be connected to the front end 101 of the main body 10 through an additional extension part 124, and this extension part 124 can be long or short. Besides keeping the oil discharge tube 12 away from the user to avoid the refined grease from splashing onto the user, it can also spray the refined grease onto large mechanical components that need lubrication at a greater distance.

The multi-stage inner hole 120 of the oil discharge tube 12, from inside to outside, is configured with a first-stage inner hole 121, a second-stage inner hole 122, and a third-stage inner hole 123. The diameter d1 of the first-stage inner hole 121 is set to be 0.5 to 3 times larger than the diameter d2 of the second-stage inner hole 122 (preferably d1 equals 2 times d2). The diameter d2 of the second-stage inner hole 122 is set to be 0.5 to 4 times larger than the diameter d3 of the third-stage inner hole 123 (preferably d2 equals 3.5 times d3). The third-stage inner hole 123 represents the smallest diameter of the multi-stage inner hole 120. Through this gradually decreasing diameter pattern of the multi-stage inner hole 120 in the oil discharge tube 12, the flow of grease 6 is facilitated to reach the interior of the refinement tube nozzle 2.

Figure 4:
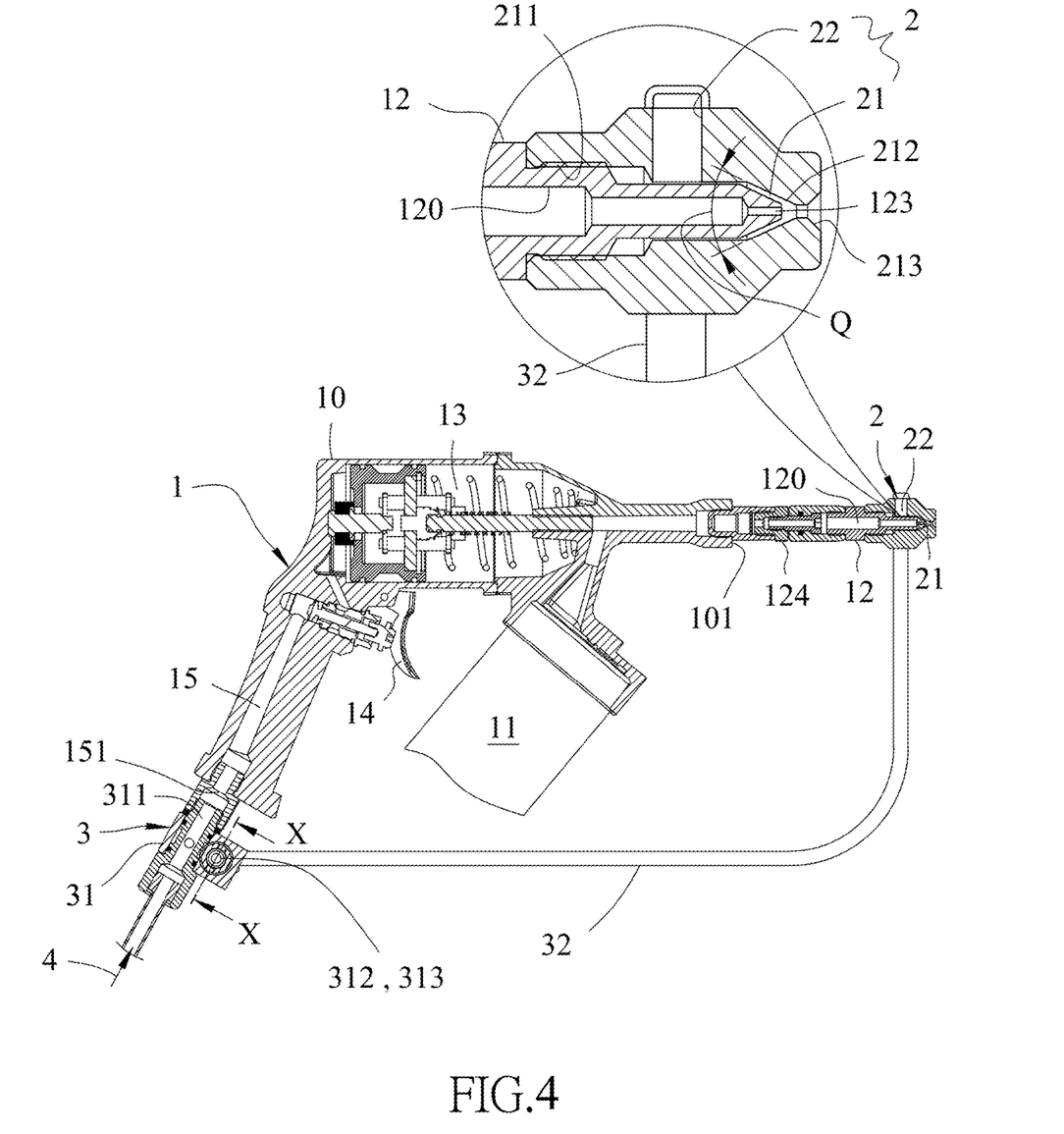
FIG. 4 is a combined sectional view of the grease gun and the lubricant atomizing device, along with an enlarged assembly view of the refinement tube nozzle of the present invention.
Figure 5:
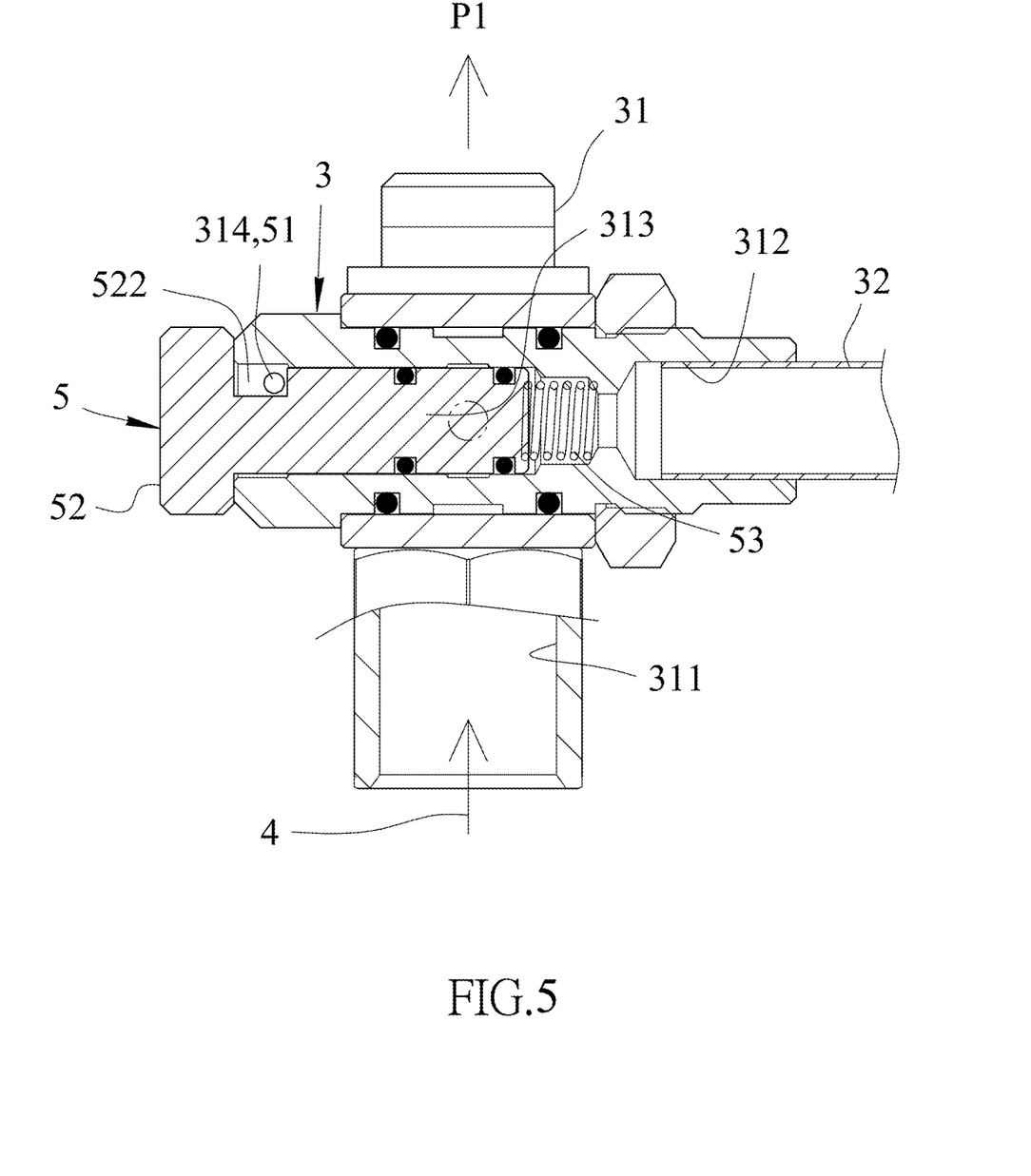
FIG. 5 is a cross sectional view, taken along line X-X of FIG. 4.
Figure 6:
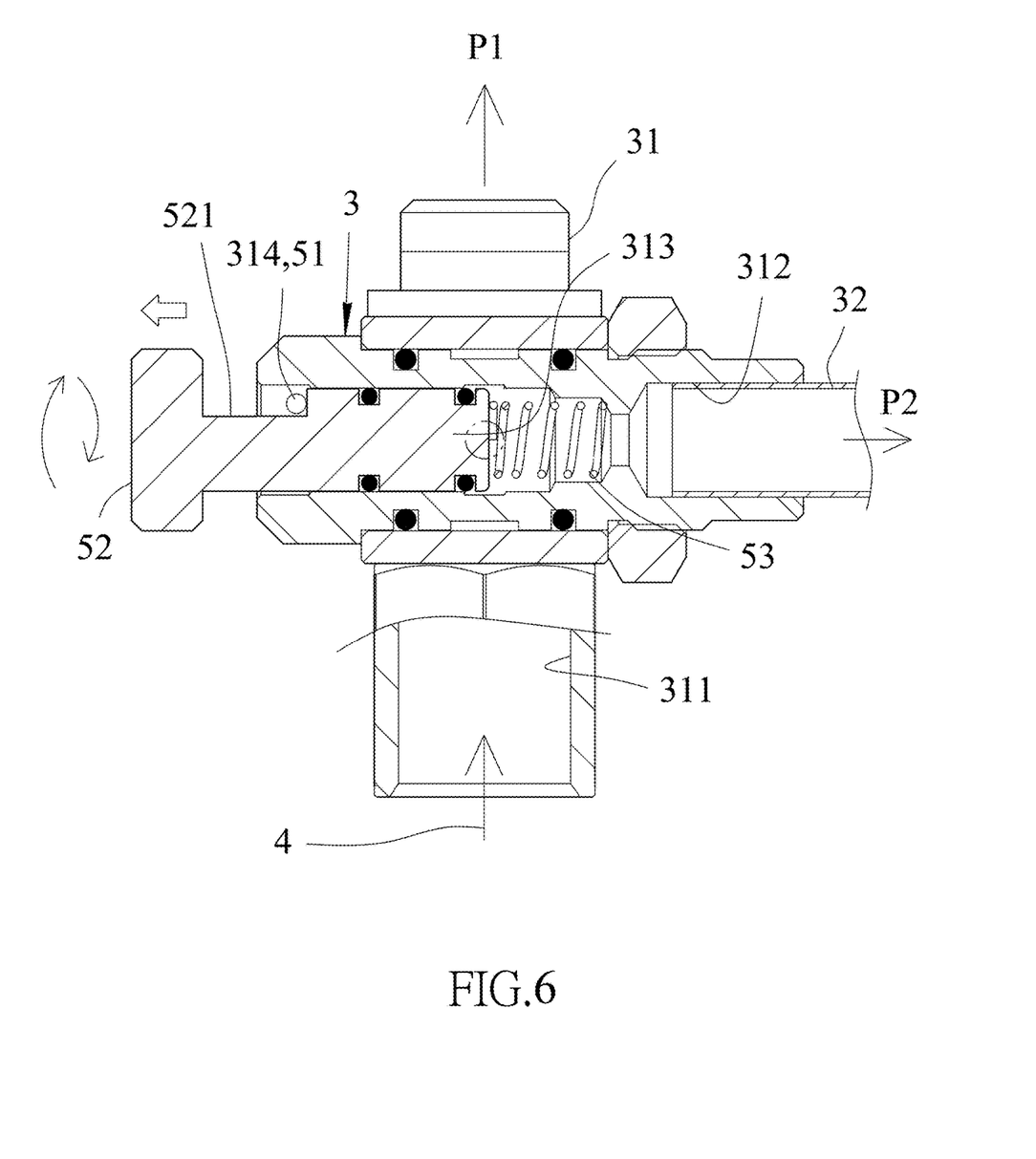
FIG. 6 is a schematic diagram showing the release groove of the rotating shaft engaged with the locking tenon in the flow diverter switch shown in FIG. 5.

The refinement tube nozzle 2, as shown in FIG. 4, has a refinement channel 21 and an air passage 22 internally, with the air passage 22 connected to the refinement channel 21. The refinement channel 21 is configured from inside to outside with a coupling section 211, a constriction section 212, and a refinement section 213. The coupling section 211 is connected to the front end of the oil discharge tube 12 by using male and female threading. The refinement channel 21 encompasses and surrounds the second-stage inner hole 122 and third-stage inner hole 123 of the multi-stage inner hole 120 of the oil discharge tube 12 before being connected to the constriction section 212. The air passage 22 is connected perpendicularly to the refinement channel 21, allowing high-pressure gas delivered from the flexible tube 32 to flow into the air passage 22 and the refinement channel 21.

The flow diverter switch 3, as shown in FIGS. 2, and 4 to 6, is installed on the main body 10 and further includes a flow diversion component 31 and a flexible tube 32. One end of the flexible tube 32 is connected to the flow diversion component 31, while the other end of the flexible tube 32 is connected to the air passage 22 of the refinement tube nozzle 2. The flow diverter switch 3 is connected to an air pressure inlet 151 of the air pressure channel 15 on the main body 10. Within the flow diversion component 31, there is a first channel 311 and a second channel 312, with the first channel 311 connected to the second channel 312 through a control zone 313. The first channel 311 corresponds and is connected to the air pressure inlet 151, while the second channel 312 corresponds to and connects with the inlet of the flexible tube 32.

Figure 7:
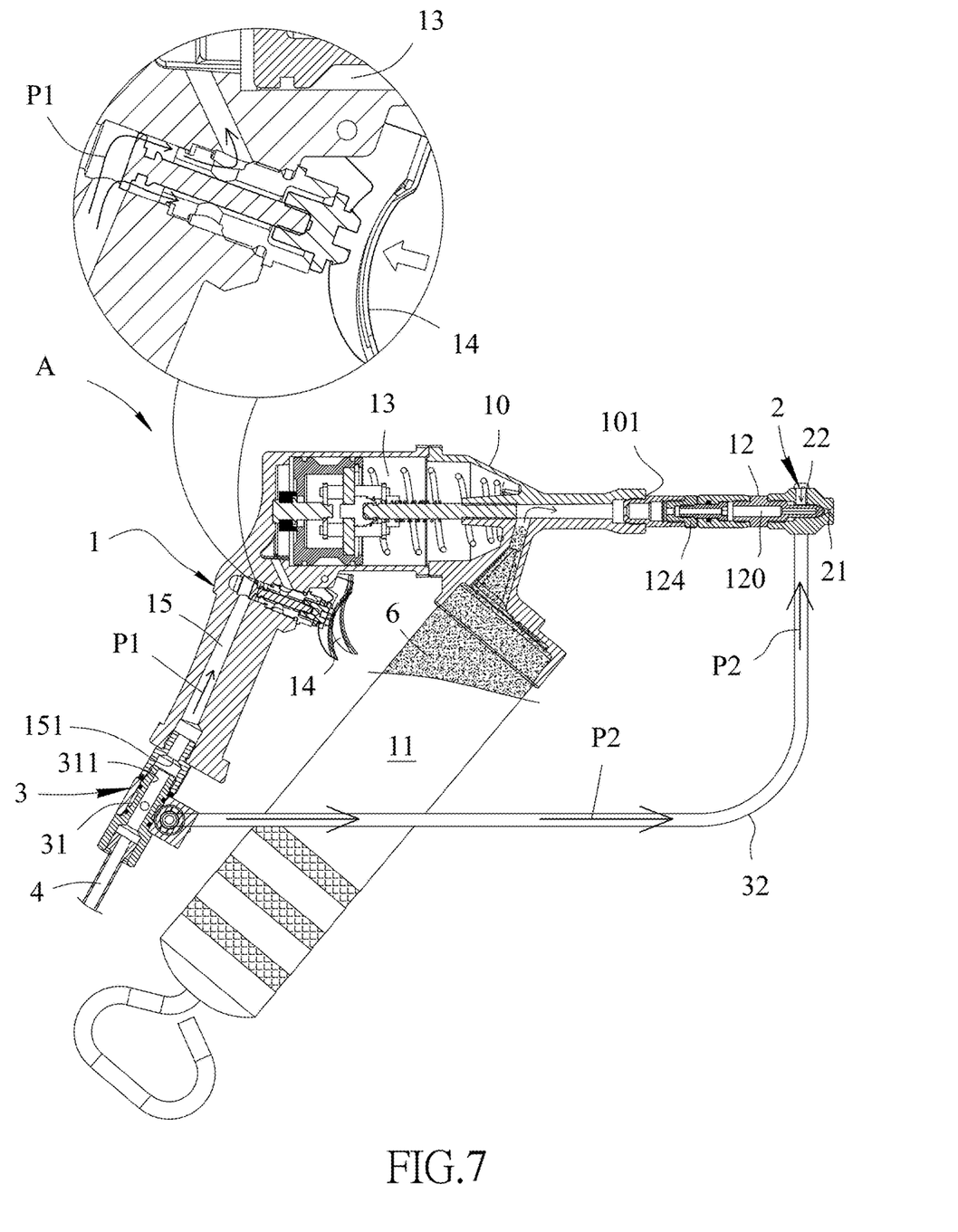
FIG. 7 is a schematic diagram showing the first air pressure driving the piston chamber to force grease forward.

When operating the flow diverter switch 3, as shown in FIG. 7, the high-pressure gas from the air pressure source 4 can be either "split into two" or shut off through the flow path of the flow diverter switch 3. The "split into two" refers to when the high-pressure gas flowing into the grease gun 1 passes through the flow diverter switch 3, where one air pressure stream is diverted to the first channel 311, then flows through the air pressure inlet 151 into the air pressure channel 15 to activate the piston chamber 13 to squeeze the grease in the grease storage area 11. The other air pressure stream flows through the second channel 312 of the flow diverter switch 3 to the flexible tube 32, then flows into the air passage 22 and refinement channel 21 located inside the refinement tube nozzle 2.

Therefore, the present invention provides an improved solution for a lubricant atomizing device of a grease gun, primarily featuring the oil discharge tube 12 installed at the front end 101 of the main body 10 of the grease gun 1, and the refinement tube nozzle 2 installed at the front end of the oil discharge tube 12. The front end of the oil discharge tube 12 correspondingly connects to the constriction section 212 of the refinement tube nozzle 2, where the constriction section 212 has an angle Q set between 40° to 60°. Furthermore, the flow diverter switch 3 is connected to the air pressure inlet 151 at the front end of the air pressure channel 15 of the grease gun 1, and the flexible tube 32 is connected between and links the second channel 312 of the flow diverter switch 3 and the air passage 22 of the refinement channel 21.

Furthermore, an external air pressure source 4 is connected to the first channel 311 of the flow diverter switch 3. The air pressure source 4 provides high-pressure gas, causing the high-pressure gas passing through the first channel 311 to form a first air pressure, while the high-pressure gas passing through the second channel 312 forms a second air pressure. The first air pressure will enter the piston chamber 13 through the air pressure channel 15, while the second air pressure will flow into the air passage 22 and the refinement channel 21 through the flexible tube 32. Typically, the pressure of the first air pressure equals that of the second air pressure.

Please refer again to FIGS. 2 to 6, the present invention also includes an operating switch 5 that is provided and installed inside the control zone 313 of the flow diversion component 31, with the control zone 313 situated between the first channel 311 and the second channel 312. The operating switch 5 further includes a locking tenon 51, a rotating shaft 52, and a spring 53. The surface of the flow diversion component 31 has a passage 314 that penetrates through and connects to the control zone 313, and the locking tenon 51 is fitted and fixed within this passage 314, meaning that part of the locking tenon 51 is positioned inside the control zone 313. Additionally, the rotating shaft 52 has a release groove 521 and a compression groove 522 that correspond and mate with the locking tenon 51. The bottom end of the rotating shaft 52 presses against one end of the spring 53, while the other end of the spring 53 presses against the bottom of the control zone 313. When the compression groove 522 of the rotating shaft 52 engages with the locking tenon 51 and compresses the spring 53, the passage between the first channel 311 and second channel 312 remains sealed. At this point, when rotating the rotating shaft 52, the spring 53 will provide a restoring force, causing the locking tenon 51 to engage with the release groove 521 and lock in position, thereby maintaining an open passage between the first channel 311 and the second channel 312. Thus, the operating switch 5 is used to control whether a portion of the high-pressure gas pressure will flow into the second channel 312 to form the second air pressure.

Figure 8:
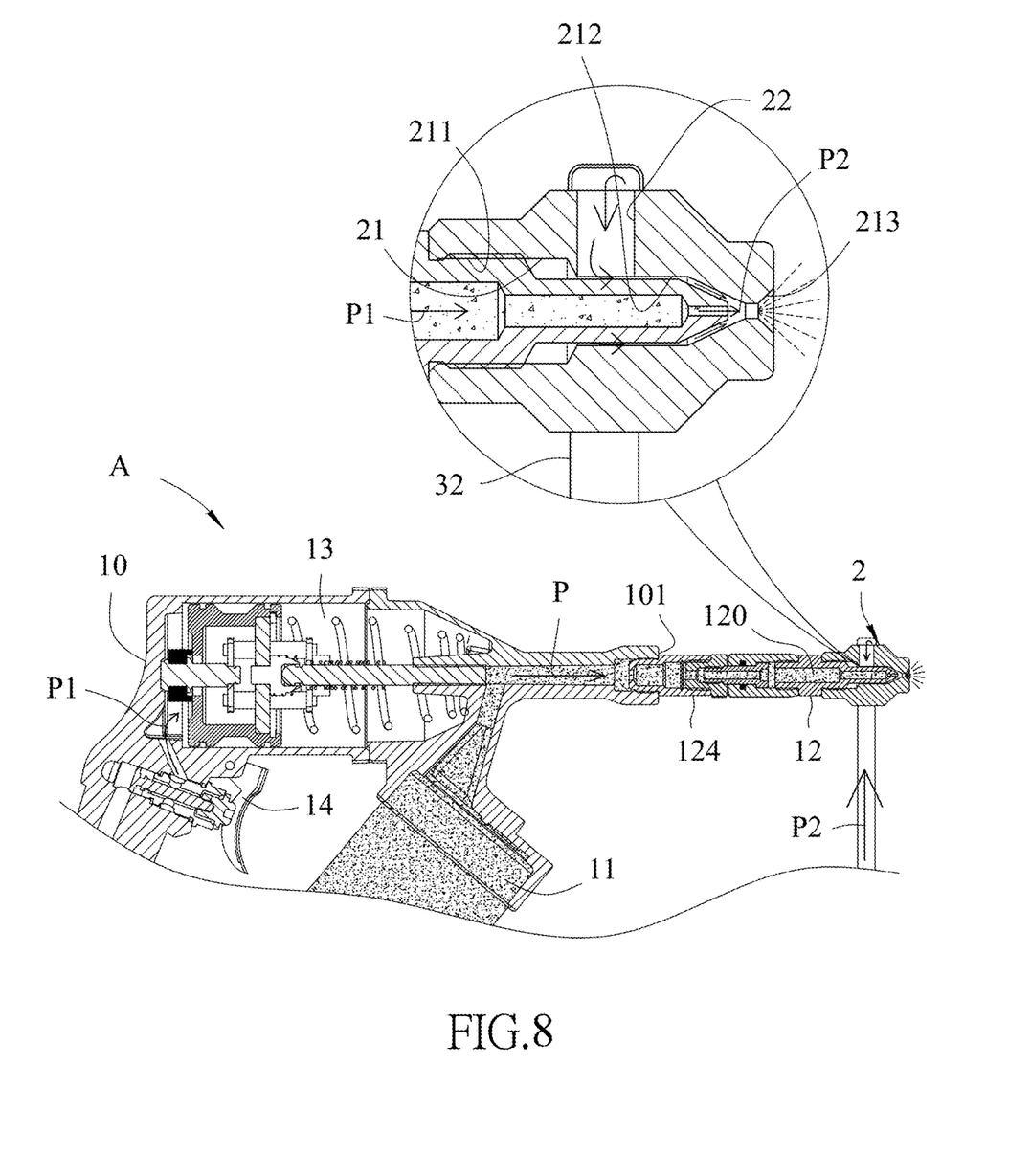
FIG. 8 is a schematic diagram showing the grease in the refinement tube nozzle being refined and sprayed out with the second air pressure.

Furthermore, please refer to FIGS. 3, 7, and 8, where when the user pulls the pressure lever 14 of the grease gun 1, the first air pressure enters the piston chamber 13 to create a first air pressure force P1, causing the piston chamber 13 to activate and force grease from the grease storage area 11 into the oil discharge tube 12. At this point, when the grease flows into the refinement channel 21, because the air passage 22 is filled with the second air pressure, both the refinement channel 21 and air passage 22 will receive the second air pressure which surrounds and envelops the grease at the front end of the oil discharge tube 12, causing the constriction section 212 to create a second air pressure force P2 that draws in and refines the grease, spraying the refined grease out through the refinement section 213.

In other words, if we define the total frictional force between the grease, the inner wall of the oil discharge tube 12, and between grease molecules as a viscous force P3, while this viscous force P3 is being pushed by the first air pressure force P1, the second air pressure surrounds the grease inside the refinement tube nozzle 2 at the front end of the oil discharge tube 12 and forms the second air pressure force P2. This results in the total force P (the sum of the first air pressure force P1 and the second air pressure force P2) being greater than the viscous force P3, thereby achieving the purpose of the present invention of smooth and uniform grease spraying. In other words, the present invention utilizes the decreasing diameter within its refinement channel 21 to accelerate the flow of the incoming second air pressure, working in conjunction with the incoming first air pressure that drives the piston chamber 13 to pressurize the grease, thereby uniformly refining the grease located in the third-stage inner hole 123 at the front end of the oil discharge tube 12 and spraying it out together through the exterior of the refinement tube nozzle 2.

Figure 9:
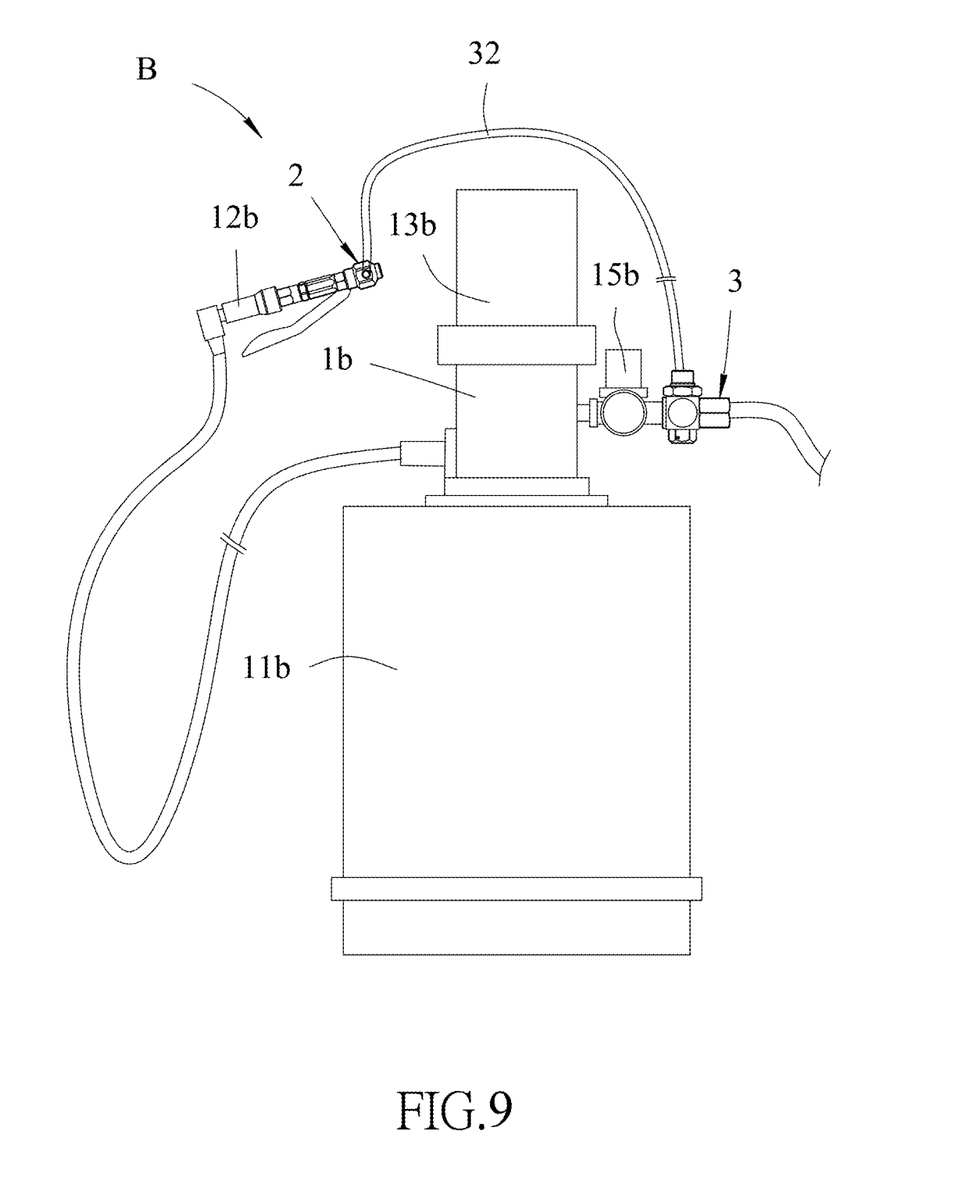
FIG. 9 is a schematic diagram of another embodiment of the grease gun and the lubricant atomizing device of the present invention.

Additionally, the present invention provides another solution for a lubricant atomizing device of a grease gun. Please refer to FIG. 9, where a grease gun 1b is a pneumatic grease gun and has a lubricant atomizing device B. The grease gun 1b is installed on top of a grease barrel to form the grease storage area 11b. The grease gun 1b is equipped with a pump 13b, an air pressure channel 15b, and an oil discharge tube 12b. The oil discharge tube 12b is connected to the refinement tube nozzle 2, and the air pressure channel 15b is connected to the flow diverter switch 3, communicating between the flow diverter switch 3 and the refinement tube nozzle 2 through the flexible tube 32. This can be applied to various types of grease guns, grease machines, or pneumatic grease guns.

When removing the refinement tube nozzle 2, oil discharge tube 12 (and extension part 124), flexible tube 32, etc. from the grease gun 1, simultaneously operate the flow diverter switch 3 to seal off the flow between the first channel 311 and second channel 312, while maintaining only the flow from the air pressure source 4 to the first channel 311 and the air pressure channel 15 inside the main body 10, then the grease gun 1 can return to its general function of injecting grease into grease nipples.

While we have shown and described the embodiment in accordance with the present invention, it should be clear to those skilled in the art that further embodiments may be made without departing from the scope of the present invention.

What is claimed is:

1. A lubricant atomizing device for a grease gun, comprising:
    a grease gun including a grease storage area installed in a main body of the grease gun and an oil discharge tube having a multi-stage inner hole, the grease storage area connected to the oil discharge tube, and an air pressure channel provided at an end of the main body;
    a refinement tube nozzle having a refinement channel and an air passage, the air passage connected to the refinement channel, the refinement tube nozzle installed and connected to a front end of the oil discharge tube, the refinement channel having a coupling section, a constriction section, and a refinement section from inside to outside thereof, the coupling section connected to the front end of the oil discharge tube, and
    a flow diverter switch installed on the main body and including a flow diversion component and a flexible tube, a first end of the flexible tube connected to the flow diversion component of the flow diverter switch, a second end of the flexible tube connected to the air passage of the refinement tube nozzle, the flow diverter switch connected to an air pressure inlet 151 located in the air pressure channel of the main body.

2. The lubricant atomizing device for a grease gun as claimed in claim 1, wherein the multi-stage inner hole of the oil discharge tube includes a first-stage inner hole, a second-stage inner hole, and a third-stage inner hole from inside to outside thereof, a diameter of the first-stage inner hole is 0.5 to 3 times larger than a diameter of the second-stage inner hole, the diameter of the second-stage inner hole is 0.5 to 4 times larger than a diameter of the third-stage inner hole, a ratio of the diameter to a length of the third-stage inner hole is between ½ and ⅙.

3. The lubricant atomizing device for the grease gun as claimed in claim 1, wherein the air passage of the refinement tube nozzle is connected perpendicularly to the refinement channel, and the constriction section has an angle, the angle is set between 40° to 60°.

4. The lubricant atomizing device for a grease gun as claimed in claim 1, wherein the flow diversion component internally contains a first channel and a second channel, the first channel is connected to the second channel through a control zone, an operating switch is fitted into and installed in the control zone, and the first channel is connected to the air pressure inlet in the main body, the second channel is connected to the inlet of the flexible tube.

5. The lubricant atomizing device for the grease gun as claimed in claim 4, wherein the operating switch includes a locking tenon, a rotating shaft, and a spring, a surface of the flow diversion component has a passage that penetrates through the control zone, the locking tenon is fitted and fixed within the passage, the rotating shaft has a release groove and a compression groove corresponding to the locking tenon, a bottom end of the rotating shaft presses against one end of the spring, the other end of the spring presses against a bottom of the control zone.

6. The lubricant atomizing device for the grease gun as claimed in claim 5, wherein when the release groove of the rotating shaft is engaged with the locking tenon, the first channel communicates with the second channel, when the compression groove of the rotating shaft is engaged with the locking tenon, the first channel does not communicate with the second channel.

7. The lubricant atomizing device for the grease gun as claimed in claim 4, wherein the flow diverter switch is connected to an external air pressure source, a high-pressure gas from the air pressure source passes through the flow diversion component of the flow diverter switch, the high-pressure gas is diverted through the first channel to form a first air pressure, and diverted through the second channel to form a second air pressure.

8. The lubricant atomizing device for a grease gun as claimed in claim 7, wherein the first air pressure forces the grease in the grease storage area to flow toward the oil discharge tube, when the grease flows into the refinement channel of the refinement tube nozzle, the grease is applied by a force P1 of the first air pressure and a force P2 of the second air pressure, so that the grease is pushed outward while continuously and uniformly refined during spraying.

9. The lubricant atomizing device for the grease gun as claimed in claim 8, wherein a total frictional force between the grease and the inner wall of the oil discharge tube and between grease molecules forms is set as a viscous force P3, when the first air pressure pushes the grease, the force of the second air pressure simultaneously draws in the grease located in the third-stage inner hole of the multi-stage inner hole, such that a total force formed by the combination of the first air pressure force P1 and the second air pressure force P2 is greater than the viscous force P3.

10. The lubricant atomizing device for the grease gun as claimed in claim 1, wherein the main body has a piston chamber 13, the piston chamber connects the air pressure channel with the oil discharge tube, the oil discharge tube is connected to a front end of the main body through an extension part.

\* \* \* \* \*